No. 862,726. PATENTED AUG. 6, 1907.
W. A. FLOWERS.
REVERSING VALVE FOR STEAM ENGINES.
APPLICATION FILED MAR. 31, 1906.

2 SHEETS—SHEET 1.

WITNESSES
E. M. Callaghan
Amos W. Hart

INVENTOR
WILLIAM A. FLOWERS
BY Munn & Co.
ATTORNEYS

No. 862,726. PATENTED AUG. 6, 1907.
W. A. FLOWERS.
REVERSING VALVE FOR STEAM ENGINES.
APPLICATION FILED MAR. 31, 1906.
2 SHEETS—SHEET 2.
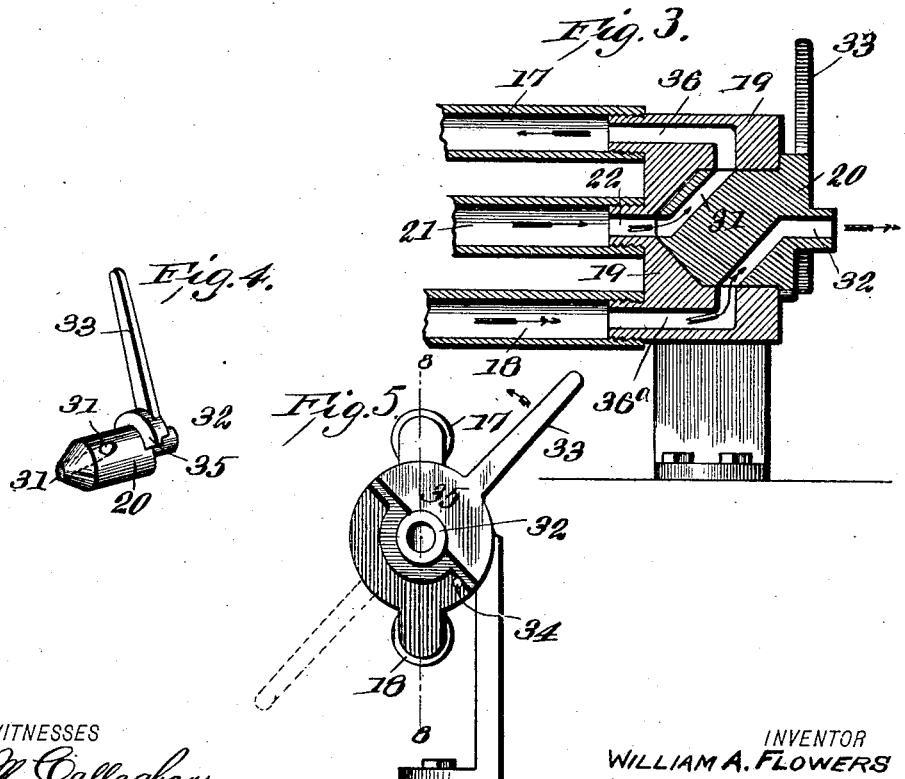
WITNESSES
INVENTOR
WILLIAM A. FLOWERS
BY
ATTORNEYS

UNITED STATES PATENT OFFICE.

WILLIAM A. FLOWERS, OF ABERDEEN, WASHINGTON.

REVERSING-VALVE FOR STEAM-ENGINES.

No. 862,726.

Specification of Letters Patent.

Patented Aug. 6, 1907.

Application filed March 31, 1906. Serial No. 309,088.

*To all whom it may concern:*

Be it known that I, WILLIAM A. FLOWERS, a citizen of the United States, and a resident of Aberdeen, in the county of Chehalis and State of Washington, have invented an Improved Reversing-Valve for Steam-Engines, of which the following is a specification.

My invention is an improvement in reversing valves and particularly for steam-engines of that class in which a steam-chest is dispensed with, the cylinder being provided with small longitudinal bores to receive rocking valves that control admission and exhaust of steam.

The details of construction, arrangement, and operation of parts are as hereinafter described, and illustrated in the accompanying drawing, in which.

Figure 1:
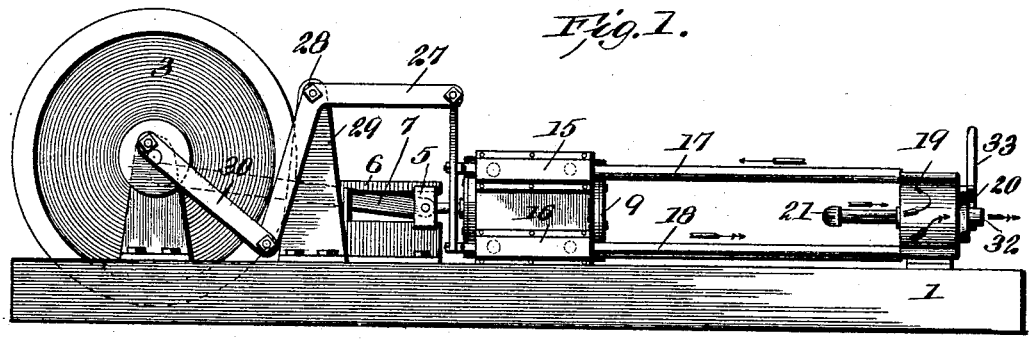
Figure 2:
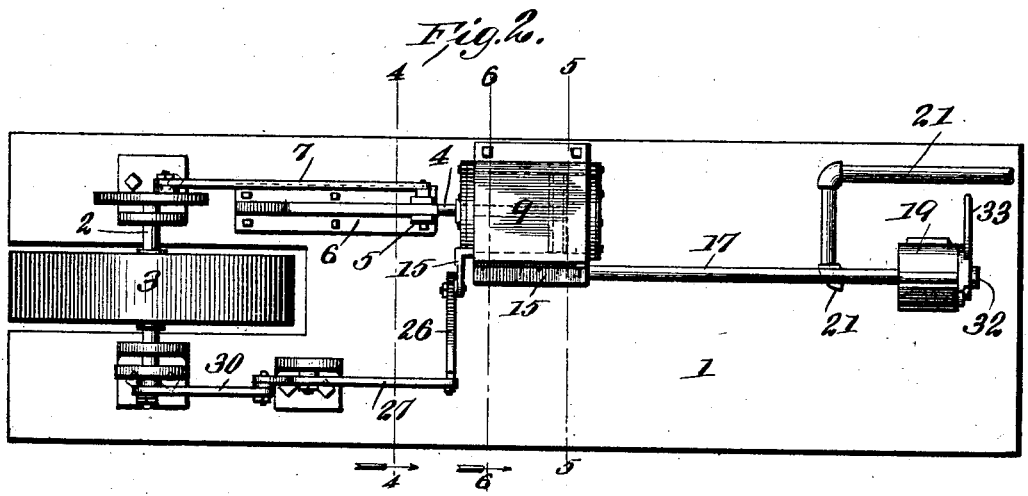

Figure 1 is a side view of an engine of the class above referred to and of which my improved valve forms a part. Fig. 2 is a plan view of same. Fig. 3 is a longitudinal section of the reversing valve and its seat with the pipes connected thereto. Fig. 4 is a perspective view of the reversing valve. Fig. 5 is an end view of the valve and valve seat.

As indicated in Figs. 1 and 2, the working parts of the engine are secured to a suitable horizontal base 1. Upon the engine shaft 2 is mounted a band-and balance-wheel 3, and the piston rod 4 is connected with a cross-head 5, which slides in suitable ways 6, and is in turn connected with the engine shaft by a rod 7. Pipes 15 and 16 connect the piston chamber of the engine with a valve-seat 19. Pipes 17 and 18—see Figs. 1 and 3—connect with such pipes 15 and 16, and with the casing 19 of the reversing valve 20. An induction-, or live-steam, pipe 21 connects with the central port 22 of the valve-seat 19, and extends thence to any suitable source of steam supply; see Fig. 2.

The admission and exhaust of steam are governed by the reversing valve 20 as will now be described. It has a cylindrical body as indicated in Fig. 4, and a conical inner end from which a port 31—see Fig. 3—leads out on the side of the valve. From the opposite or outer end of the valve a port 32 leads inward to the side of the valve. The port 31 always serves for induction, or admission of live steam, from a central supply pipe 21, while the other port 32 always serves for exhaust. The valve is provided with the lever arm 33 by which it may be rocked one-half way around, a stop 34 being provided to arrest its rotation, the same coming in contact with the segmental head 35—see Fig. 4—which is formed on the outer end of the valve. The valve seat has opposite ports 36, 36ª, with which the pipes 17 and 18, respectively, connect. Each of these pipes serves for admission of steam and also for exhaust of steam, according to the position in which the valve is placed and the direction in which the engine is to be run. Thus, when the valve 20 is placed in the position shown in Figs. 3 and 5, steam is being admitted to the pipe 17 and thus to the pipe 15 forming an attachment of the engine cylinder. The valve is maintained in this position so long as the engine is to be driven in one direction; but, when it is desired to reverse the engine, the valve arm 33 is thrown over to the left, or into the position indicated by dotted lines Fig. 7, whereby the relation of the valve ports 31 and 32 to the ports 36, 36ª, of the valve seat will be changed, or reversed. In other words, steam will then be admitted from the induction pipe 21 to the pipe 18, and exhaust will take place through pipe 17. In this way the pipes 17, 18, and the connecting pipes 15, 16, serve alternately for admission and exhaust of steam. Hence, by the simple movement of the valve lever the engine is reversed, the usual link motion being dispensed with, so that the cost, weight, and friction of parts are greatly reduced. The engine having also practically but one eccentric, the cost and weight are further reduced and also the power necessary to run the engine. The friction of the cylindrical valves is also much less than the ordinary slide valves, since they are practically subjected to no steam pressure.

It will be understood that, when the arm 33 of the reversing valve is adjusted in the middle position intermediate of the extremities of its movement, communication through the valve ports 31, 32, will be cut off and thus no steam will be admitted and none exhausted from the engine.

What I claim is—

In an engine of the class indicated, the combination, with pipes 17, 18, and 21, connected with engine ports and a steam supply as specified, for conveying live and exhaust steam, and the valve-casing 19 having a central conical valve-seat with a central port connecting with the inlet steam-pipe 21, and two lateral ports connecting with the aforesaid pipes 17, 18, of the rotary reversing valve 20 having a segmental head, and provided with two ports, one being an inlet port 31 leading from the center of the valve laterally, to connect the inlet pipe 21 with either of the side pipes 17, 18, alternately, and the outlet port 32 leading from the side of the valve out through the head thereof and arranged to connect alternately with pipes 17 and 18 for discharge of exhaust steam, a laterally projecting hand lever secured to the segmental head of the valve, and a stop on the casing arranged for contact with said head, as shown and described.

WILLIAM A. FLOWERS.

Witnesses:
L. A. DOYLE,
BERNICE HUTTON.